(12) United States Patent
Sato

(10) Patent No.: US 10,895,904 B2
(45) Date of Patent: Jan. 19, 2021

(54) INFORMATION PROCESSING APPARATUS, STORAGE DEVICE, AND METHOD PERFORMED BY HOST SYSTEM

(71) Applicant: TOSHIBA MEMORY CORPORATION, Tokyo (JP)

(72) Inventor: Masayoshi Sato, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 166 days.

(21) Appl. No.: 16/034,961

(22) Filed: Jul. 13, 2018

(65) Prior Publication Data

US 2019/0220082 A1 Jul. 18, 2019

(30) Foreign Application Priority Data

Jan. 15, 2018 (JP) .................................. 2018-004459

(51) Int. Cl.
| | |
|---|---|
| *G06F 1/3234* | (2019.01) |
| *G06F 1/3296* | (2019.01) |
| *G06F 1/28* | (2006.01) |
| *G06F 1/3225* | (2019.01) |
| *G06F 1/324* | (2019.01) |
| *G06F 1/3206* | (2019.01) |

(52) U.S. Cl.
CPC .............. *G06F 1/3275* (2013.01); *G06F 1/28* (2013.01); *G06F 1/324* (2013.01); *G06F 1/3206* (2013.01); *G06F 1/3225* (2013.01); *G06F 1/3268* (2013.01); *G06F 1/3278* (2013.01); *G06F 1/3296* (2013.01)

(58) Field of Classification Search
CPC ........ G06F 1/3275; G06F 1/28; G06F 1/3206; G06F 1/3225; G06F 1/324; G06F 1/3268; G06F 1/3278; G06F 1/3296
USPC .................................................. 713/300–340
See application file for complete search history.

(56) References Cited

U.S. PATENT DOCUMENTS

| | | | | |
|---|---|---|---|---|
| 5,471,353 A | * | 11/1995 | Codilian ................ | G11B 19/00 318/278 |
| 6,170,028 B1 | * | 1/2001 | Wallach .................... | G06F 1/20 710/10 |

(Continued)

*Primary Examiner* — Paul R. Myers
(74) *Attorney, Agent, or Firm* — Kim & Stewart LLP

(57) ABSTRACT

An information processing apparatus communicates with a storage device and includes a serial interface configured to support plural link rates, and a controller. The controller retrieves from the storage device via the serial interface information indicating a relationship between maximum power consumption and power consumption efficiency value for each link rate in a first power throttling mode that gives priority to performance and a second power throttling mode that gives priority to reduction of peak power, the power consumption efficiency value being a value that corresponds to the number of I/Os per watt, select the first or the second power throttling mode based on the retrieved information and a mode specified from one of three modes, and instruct the storage device to limit power consumption based on the selected power throttling mode. The three modes include a first mode that gives priority to performance, a second mode that gives priority to reduction of power consumption, and a third mode that gives priority to reduction of peak power.

6 Claims, 12 Drawing Sheets

(56) References Cited

U.S. PATENT DOCUMENTS

| | | | | |
|---|---|---|---|---|
| 6,859,886 B1* | 2/2005 | Johnson | G06F 1/3203 | 327/540 |
| 7,356,756 B1* | 4/2008 | Chan | H03M 13/356 | 714/781 |
| 7,370,132 B1* | 5/2008 | Huang | G06F 13/4018 | 710/305 |
| 8,966,293 B1* | 2/2015 | Dutch | G06F 3/0625 | 713/300 |
| 9,824,773 B1* | 11/2017 | Arabi | G06F 1/3275 | |
| 2003/0090236 A1* | 5/2003 | Odaohhara | G06F 1/263 | 320/134 |
| 2004/0041538 A1* | 3/2004 | Sklovsky | H04W 52/0264 | 320/127 |
| 2007/0273714 A1* | 11/2007 | Hodge | G09G 3/20 | 345/690 |
| 2008/0058999 A1* | 3/2008 | Khodorkovsky | G06F 1/206 | 700/297 |
| 2008/0301474 A1* | 12/2008 | Bussa | G06F 1/3203 | 713/300 |
| 2009/0144568 A1* | 6/2009 | Fung | G06F 1/3203 | 713/300 |
| 2010/0205351 A1* | 8/2010 | Wiener | G06F 12/0246 | 711/103 |
| 2010/0274953 A1* | 10/2010 | Lee | G06F 1/266 | 711/103 |
| 2011/0083029 A1* | 4/2011 | Tupa | G06F 1/3203 | 713/324 |
| 2012/0026197 A1* | 2/2012 | Li | G06F 3/0485 | 345/650 |
| 2013/0268791 A1* | 10/2013 | Yamana | G06F 1/3293 | 713/323 |
| 2013/0339757 A1* | 12/2013 | Reddy | G06F 1/3212 | 713/300 |
| 2014/0059359 A1* | 2/2014 | Bahirat | G06F 1/324 | 713/300 |
| 2014/0137107 A1* | 5/2014 | Banerjee | G06F 1/3234 | 718/1 |
| 2014/0222242 A1* | 8/2014 | Poornachandran | G06F 11/3058 | 700/300 |
| 2014/0379940 A1* | 12/2014 | Fulkerson | G06F 3/0659 | 710/5 |
| 2015/0032913 A1* | 1/2015 | Kim | G06F 13/28 | 710/24 |
| 2015/0072627 A1* | 3/2015 | Balasubramanian | H04B 15/02 | 455/77 |
| 2015/0169036 A1* | 6/2015 | Sodhi | G06F 1/3287 | 713/320 |
| 2015/0356035 A1* | 12/2015 | Singh | G06F 13/24 | 712/244 |
| 2016/0320995 A1 | 11/2016 | Warriner | | |
| 2017/0371399 A1* | 12/2017 | Weissmann | G06F 1/266 | |
| 2018/0058976 A1* | 3/2018 | Gross | G01M 7/025 | |
| 2019/0018600 A1* | 1/2019 | Tomaszewski | G06F 3/0653 | |

\* cited by examiner

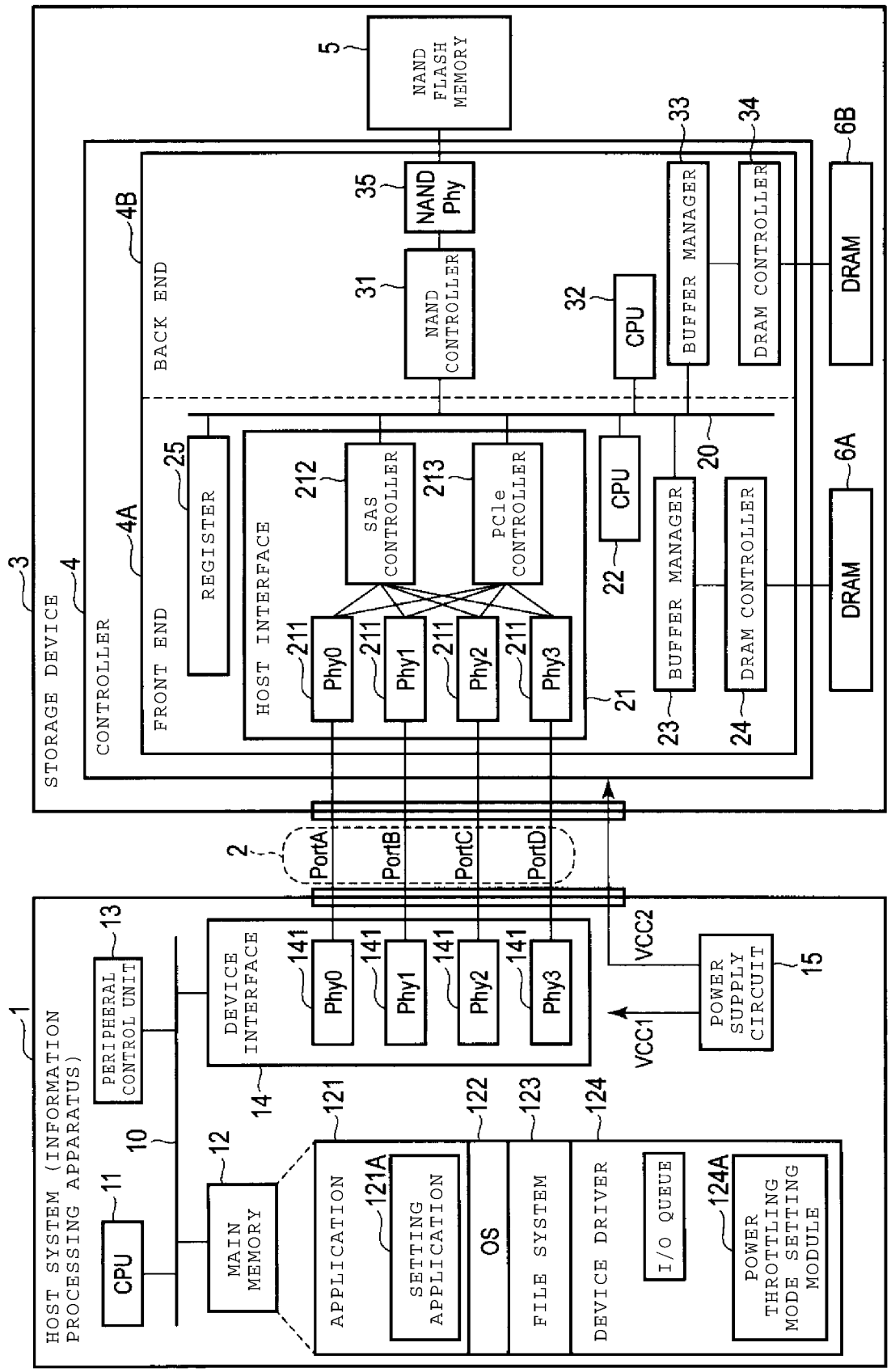

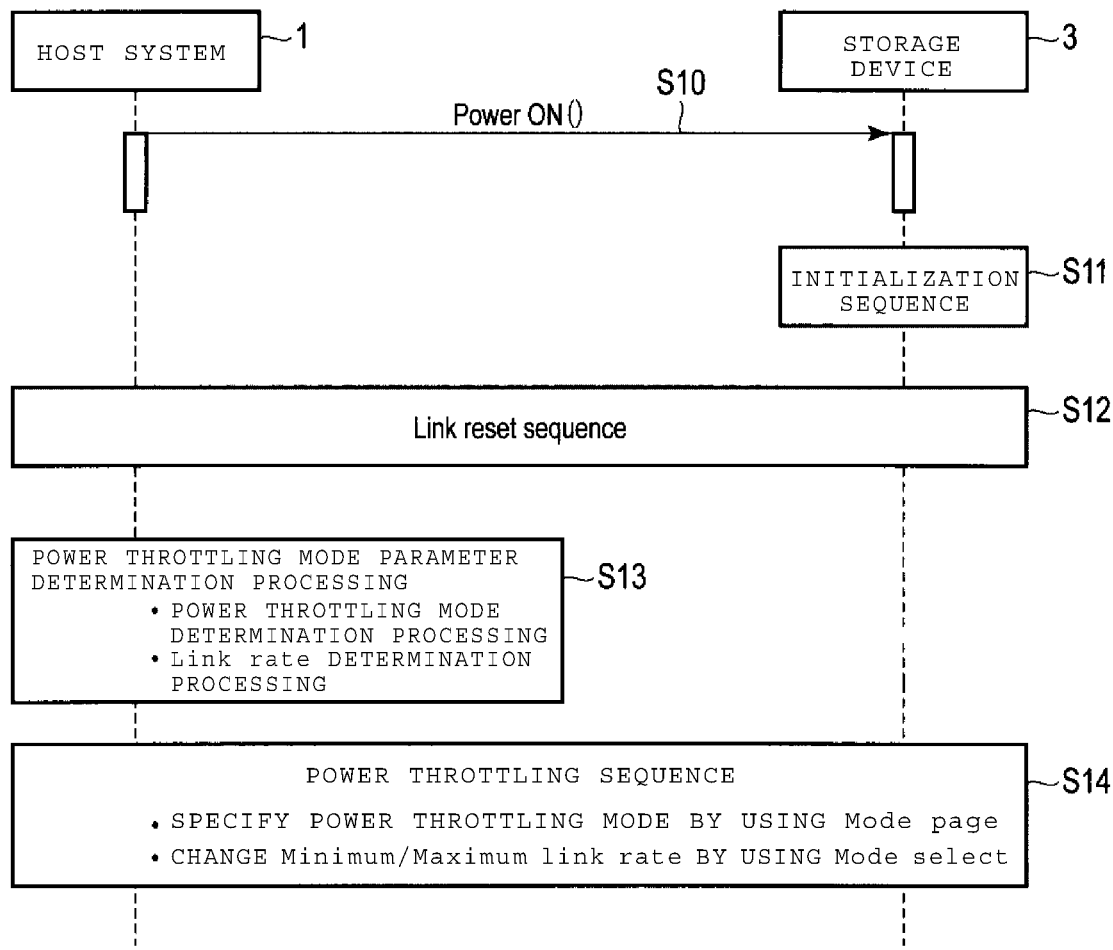

FIG. 4

Power level mode (A): MODE THAT PERFORMS POWER THROTTLING WITH PERFORMANCE PRIORITIZED

| Port A | Port B | POWER THROTTLING (MAXIMUM POWER CONSUMPTION) | POWER CONSUMPTION EFFICIENCY (IOPS/W): IOPS PER WATT | PERFORMANCE RATIO (RATIO OF IOPS WHEN Port A/B 6G 9W IS 1) |
|---|---|---|---|---|
| 6G | 6G | 9W | A | 1 |
| 12G | 6G | 12W | B | 1.5 |
| 6G | 12G | 12W | B | 1.5 |
| 12G | 12G | 12W | D (or E) | 2 |

Power level mode (B) MODE THAT PERFORMS POWER THROTTLING WITH REDUCTION OF PEAK POWER PRIORITIZED

| Port A | Port B | POWER THROTTLING (MAXIMUM POWER CONSUMPTION) | POWER CONSUMPTION EFFICIENCY (IOPS/W): IOPS PER WATT | PERFORMANCE RATIO (RATIO OF IOPS WHEN Port A/B 6G 9W IS 1) |
|---|---|---|---|---|
| 6G | 6G | 9W | A | 1 |
| 12G | 6G | 9W | C | 1.25 |
| 6G | 12G | 9W | C | 1.25 |
| 12G | 12G | 9W | E (or D) | 1.5 |

FIG. 5

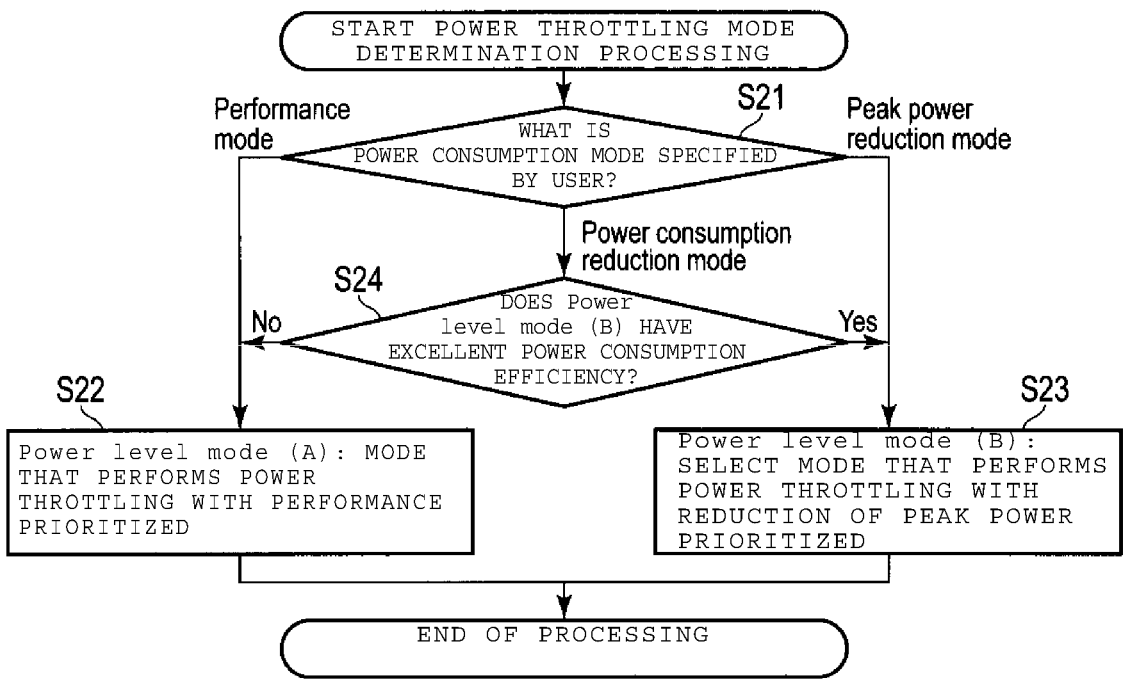

FIG. 8

POWER THROTTLING MODE Interface (EXAMPLE: Mode page 36h)

| Byte | Bit7 | Bit6 | Bit5 | Bit4 | Bit3 | Bit2 | Bit1 | Bit0 |
|------|------|------|------|------|------|------|------|------|
| 0 | SP | SPF(0b) | PAGE CODE(36h) | | | | | |
| 1 | PAGE LENGTH(0Eh) | | | | | | | |
| 2 | Init_Set_En | LR_Set_En | Power_Level_Mode | | | | | |
| 3 | Reserved | | | | | | | |
| 15 | | | | | | | | |

*FIG. 13*

| Byte\Bit | 7 | 6 | 5 | 4 | 3 | 2 | 1 | 0 |
|---|---|---|---|---|---|---|---|---|
| 0 | SP | SPF(1b) | \multicolumn{6}{c|}{PAGE CODE (19h)} | | | | | |
| 1 | \multicolumn{8}{c|}{SUBPAGE CODE (01h)} | | | | | | | |
| 2 | (MSB) | \multicolumn{7}{c|}{PAGE LENGTH (n-3)} | | | | | | |
| 3 | | | | | | | | (LSB) |
| 4 | \multicolumn{8}{c|}{Reserved} | | | | | | | |
| 5 | \multicolumn{4}{c|}{Reserved} | \multicolumn{4}{c|}{PROTOCOL IDENTIFIER (6h)} | | | | | | | |
| 6 | \multicolumn{8}{c|}{GENERATION CODE} | | | | | | | |
| 7 | \multicolumn{8}{c|}{NUMBER OF PHYS} | | | | | | | |

| | SAS Phy mode descriptor list |
|---|---|
| 8 ... 55 | SAS Phy mode descriptor (first)<br>(Min/Max link rate of Port 1) |
| ⋮ | ⋮ |
| n-47 ... n | SAS Phy mode descriptor (last) (see table 213)<br>(Min/Max link rate of Port n) |

FIG. 14

Phy capabilities

| Byte\Bit | 7 | 6 | 5 | 4 | 3 | 2 | 1 | 0 |
|---|---|---|---|---|---|---|---|---|
| 0 | START (1b) | TX SSC TYPE | Reserved | Reserved | REQUESTED LOGICAL LINK RATE | | | |
| 1 | G1 WITHOUT SSC | G1 WITH SSC | G2 WITHOUT SSC | G2 WITH SSC | G3 WITHOUT SSC | G3 WITH SSC | G4 WITHOUT SSC | G4 WITH SSC |
| 2 | Reserved | | | | | | | |
| 3 | Reserved | | | | | | | PARITY |

Supported settings (Byte 1)

INFORMATION PROCESSING APPARATUS, STORAGE DEVICE, AND METHOD PERFORMED BY HOST SYSTEM

CROSS-REFERENCE TO RELATED APPLICATIONS

This application is based upon and claims the benefit of priority from Japanese Patent Application No. 2018-004459, filed Jan. 15, 2018, the entire contents of which are incorporated herein by reference.

FIELD

Embodiments described herein relate generally to an information processing apparatus, a storage device connected to the information processing apparatus via a serial interface, and a method performed by a host system.

BACKGROUND

Various storage devices such as a Hard Disk Drive (HDD) and a Solid State Drive (SSD) have become popular, and storage devices having a function of reducing the power consumption have also been developed.

In the field of information processing apparatus such as server computers, serial interfaces such as Serial Attached SCSI (SAS), Serial ATA (SATA), and PCI Express (PCIe®) have been used for their storage device. In general, such serial interfaces support a plurality of link rates or data transfer rates, and the storage device operates at each link rate so as not to exceed the preconfigured maximum power. However, from the viewpoint of performance, the maximum power is sometimes set to the power required for using the fastest link rate.

DESCRIPTION OF THE DRAWINGS

FIG. 1 is a block diagram showing a configuration example of each of a host system and a storage device according to embodiments.

FIG. 2 is a sequence diagram showing an outline of a procedure of processing of determining a power throttling mode and a link rate.

FIG. 3 is a diagram for explaining a first mode that gives priority to performance, a second mode that gives priority to reduction of power consumption, and a third mode that gives priority to reduction of peak power, that can be specified by a user, respectively.

FIG. 4 is a diagram showing information indicating a correspondence relationship between a link rate, maximum power consumption, and power consumption efficiency in a case where the storage device is set to a first power throttling mode, and a correspondence relationship between a link rate, maximum power consumption, and power consumption efficiency in a case where the storage device is set to a second power throttling mode.

FIG. 5 is a flowchart showing a procedure of power throttling mode determination processing executed by the host system.

FIG. 8 is a diagram showing an example of a mode page used for setting a determined power throttling mode to the storage device.

FIG. 13 is a diagram showing mode page information including the minimum/maximum link rate of each port.

FIG. 14 is a diagram showing details of the Phy capabilities.

DETAILED DESCRIPTION

Figure 6:
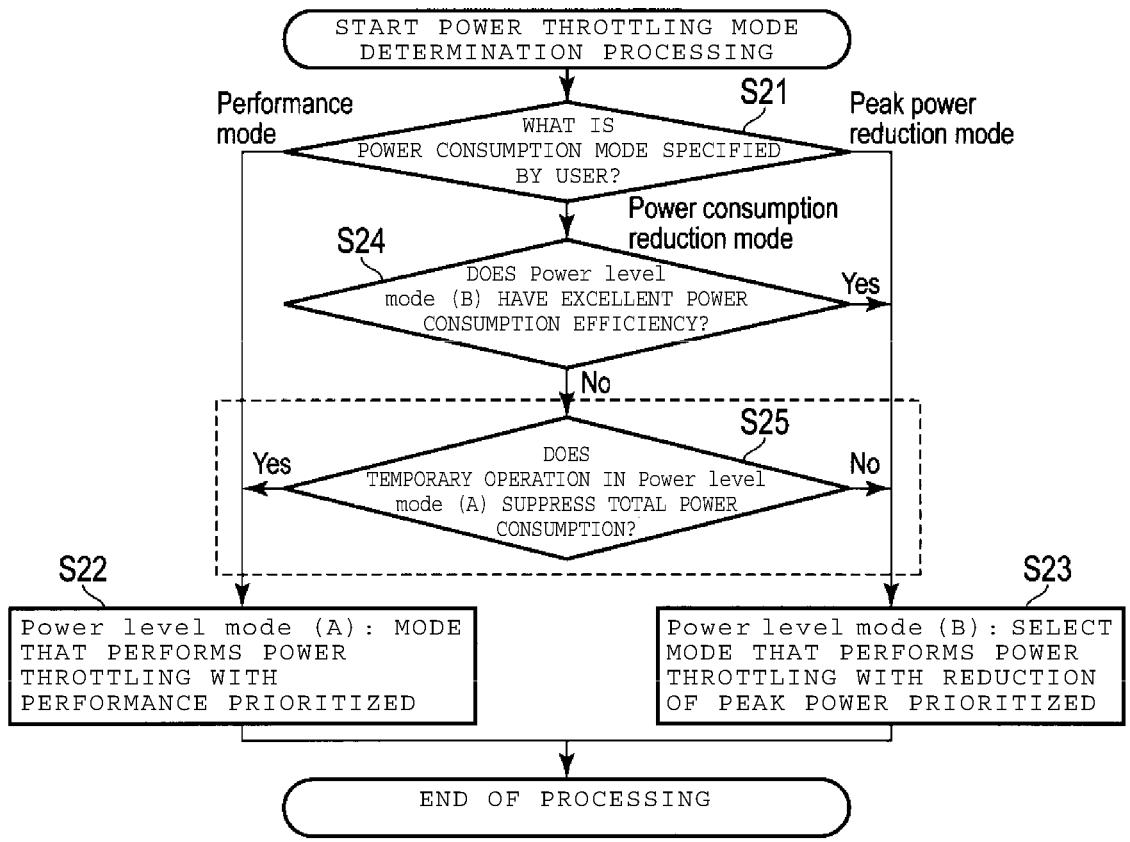
FIG. 6 is a flowchart showing another procedure of power throttling mode determination processing executed by the host system.

Embodiments provide an information processing apparatus, a storage device, and a method performed by a host system, which accounts for situations where the fastest link rate is not required for the storage device so that power is not wastefully consumed.

According to the embodiment, an information processing apparatus is configured to communicate with a storage device. The information processing apparatus includes a serial interface configured to support a plurality of link rates, and a controller. The controller is configured to retrieve from the storage device via the serial interface information indicating a relationship between a maximum power consumption and a power consumption efficiency value for each link rate in each of a first power throttling mode that gives priority to performance and a second power throttling mode that gives priority to reduction of peak power, the power consumption efficiency value being a value that corresponds to the number of I/Os per watt, select one of the first and second power throttling modes based on the retrieved information and a mode specified from one of three modes, and instruct the storage device to limit power consumption based on the selected power throttling mode. The three modes include a first mode that gives priority to performance, a second mode that gives priority to reduction of power consumption, and a third mode that gives priority to reduction of peak power.

Hereinafter, embodiments will be described with reference to drawings.

First, the configuration of each of a host system 1 and a storage device 3 will be described with reference to FIG. 1.

A host system 1 is an information processing apparatus such as a server computer, a personal computer, and various other electronic devices and is connected to a storage device 3 via a serial interface 2. The host system 1 is configured to write data to the storage device 3 and read data from the storage device 3.

Examples of the serial interface 2 include Serial Attached SCSI (SAS), Serial ATA (SATA), PCI Express (PCIe®), and the like.

The serial interface 2 includes at least one port (Port). Each port may include a pair of differential signal lines for reception and a pair of differential signal lines for transmission. Data transfer between the host system 1 and the storage device 3 is executed via one or more ports. In PCIe and the like, this port is also called a lane.

In FIG. 1, the serial interface 2 includes four ports, that is, Port A, Port B, Port C, and Port D.

For example, in the current SAS standard, four kinds of link rates, 1.5 Giga bits per second (Gbps), 3 Gbps, 6 Gbps, and 12 Gbps, are defined. In addition, in the current NVM Express (NVMe®) standard using PCIe, four kinds of link rates, Gen 1 (2.5 Giga Transfers per second (GT/s)), Gen 2 (5 GT/s), Gen 3 (8 GT/s), Gen 4 (16 GT/s) are defined. Here, the link rate means a bit rate (data transfer rate) executed via the serial interface 2. Normally, the faster the link rate used, the higher the I/O performance is, but the power consumed by the storage device increases.

The host system 1 is configured to determine an optimum power throttling mode to be applied to the storage device 3 and instruct the storage device 3 to execute a power throttling operation for limiting maximum power consumption of the storage device 3 in the determined optimum power throttling mode. In addition, the host system 1 may determine not only an optimum power throttling mode but also an optimum link rate to be applied to the storage device 3 and instruct the storage device 3 both of the determined link rate and the determined power throttling mode.

The storage device 3 supports a plurality of power throttling modes each using different maximum power consumption, and executes the power throttling operation for limiting the maximum power consumption of the storage device 3 by using the power throttling mode specified by mode specification information from the host system 1. More specifically, the storage device 3 limits the maximum power consumption of the storage device 3 to the maximum power consumption corresponding to the power throttling mode specified by the mode specification information from the host system 1.

In an embodiment, the storage device 3 has a first power throttling mode that gives priority to performance and a second power throttling mode that gives priority to reduction of peak power. The set values of the maximum power consumption applied to the first power throttling mode and the maximum power consumption applied to the second power throttling mode are different from each other. Basically, in the second power throttling mode that gives priority to reduction of peak power, the maximum power consumption is lower than that of the first power throttling mode.

Therefore, in a case where the storage device 3 executes the power throttling operation in the second power throttling mode, in other words, in a case where the maximum power consumption of the storage device 3 is limited to the lower maximum power consumption corresponding to the second power throttling mode, the maximum power consumption (peak power) of the storage device 3 is reduced to a value lower than the first power throttling mode.

The power throttling operation may include an operation for controlling/adjusting the power consumed by the storage device 3. In a case where the first power throttling mode is specified by the host system 1, the storage device 3 controls/adjusts the power consumed by the storage device 3 so that the maximum power consumption of the storage device is limited to the maximum power consumption or lower corresponding to this first power throttling mode. On the other hand, in a case where the second power throttling mode is specified by the host system 1, the storage device 3 controls/adjusts the power consumed by the storage device 3 so that the maximum power consumption (peak power) is limited to the maximum power consumption or lower corresponding to this second power throttling mode.

Examples of processing of controlling/adjusting the power consumed by the storage device 3 include an operation of changing the frequency of each clock signal supplied to a specific portion or all of the hardware circuits in the storage device 3 and various other power limiting operations of restricting the maximum power consumption to a certain value.

The host system 1 includes a Central Processing Unit (CPU) 11, a main memory 12, a peripheral control unit 13, a device interface 14, a power supply circuit 15, and the like. The CPU 11, the main memory 12, the peripheral control unit 13, and the device interface 14 are interconnected via a bus 10.

The CPU 11 is a processor that controls various components of the host system 1. The CPU 11 is a circuit that operates by executing various programs loaded in the main memory 12. These programs include an application program group 121, an Operating System (OS) 122, a file system 123, a device driver 124, and the like.

The application program group 121 includes a setting application program 121A. The setting application program 121A may present the user with a user interface (Graphical User Interface (GUI)) or Character User Interface (CUI) for enabling the user to customize the power setting of the storage device 3.

In the present embodiment, the setting application program 121A executes processing for allowing the user to select one of a first mode that gives priority to performance, a second mode that gives priority to reduction of power consumption, and a third mode that gives priority to reduction of peak power.

The first mode that gives priority to performance is used as a mode for giving the highest priority to the performance (I/O performance) of the storage device 3. The second mode that gives priority to reduction of power consumption is used as a mode for giving the highest priority to reduction of the total power consumption of the storage device 3. The third mode that gives priority to reduction of the maximum power consumption (peak power) is used as a mode for reducing the maximum power consumption (peak power) as low as possible.

The device driver 124 is a device driver program for controlling the storage device 3 via the serial interface 2. The device driver 124 may transmit a write command, a read command, and various control commands to the storage device 3 via the serial interface 2. In addition, the device driver 124 includes a power throttling mode setting module 124A.

The power throttling mode setting module 124A executes processing of determining an optimum power throttling mode and an optimum link rate to be applied to the storage device 3 and processing of sending mode specification information specifying the determined power throttling mode and link rate specification information specifying the determined link rate to the storage device 3. By sending the link rate specification information to the storage device 3, it is possible to instruct the storage device 3 to establish a link between the host system 1 and the storage device 3 at the determined link rate.

The power throttling mode setting module 124A receives the mode (the first mode, the second mode, or the third mode) specified by the user from the setting application program 121A. In addition, the power throttling mode setting module 124A acquires or retrieves from the storage device 3 information indicating: (i) a correspondence relationship between maximum power consumption and power consumption efficiency for each link rate of the storage device 3 in a case where the storage device 3 is set to the first power throttling mode; and (ii) a correspondence relationship between maximum power consumption and power consumption efficiency for each link rate of the storage device 3 in a case where the storage device 3 is set to the second power throttling mode (hereinafter, referred to as "correspondence relationship information" about link rate/ maximum power consumption/power consumption efficiency). Here, the power consumption efficiency means the number of I/Os per second per watt, that is, IOPS/W.

The power throttling mode setting module 124A determines a power throttling mode suitable for the mode specified by the user (the first mode, the second mode, or the third mode) based on correspondence relationship information about link rate/maximum power consumption/power consumption efficiency. When determining the power throttling mode, the power throttling mode setting module 124A may take into account the number of I/Os to be processed which are stored in an I/O queue 124B. The I/O queue 124B is a command issuing queue for storing I/O requests to be sent to the storage device 3.

The correspondence relationship information about link rate/maximum power consumption/power consumption efficiency may be held in advance in the storage device 3. In this case, in the SAS, the power throttling mode setting module 124A may read the correspondence relationship information about the link rate/maximum power consumption/power consumption efficiency from the storage device 3 by using Mode Page and in the NVMe, may read correspondence relationship information about the link rate/maximum power consumption/power consumption efficiency from the storage device 3 by using Get Feature. Alternatively, the power throttling mode setting module 124A may measure the link rate, the maximum power consumption, and the power consumption efficiency of the storage device 3 and acquire the correspondence relationship information about the above link rate/maximum power consumption/power consumption efficiency by this measurement.

Since the power throttling mode setting module 124A is executed by the CPU 11, the CPU 11 functions as a controller that controls the storage device 3 so that the behavior of the storage device 3 is dynamically changed according to the mode specified by the user.

Alternatively, dedicated hardware incorporating a circuit that executes the function of the power throttling mode setting module 124A may be used as the controller described above.

That is, the above-described controller may be implemented by a processing circuit such as a processor such as the CPU 11 or various other hardware circuits.

The peripheral control unit 13 controls peripheral devices such as a display and an input device. The device interface 14 functions as a physical layer for controlling the serial interface 2. This device interface 14 includes four physical layer circuits (Phy 0, Phy 1, Phy 2, and Phy 3) 141 corresponding to Port A, Port B, Port C, and Port D, respectively. The power supply circuit 15 generates operation power VCC 1 to be supplied to the components in the host system 1 and operation power VCC 2 to be supplied to the storage device 3.

The storage device 3 is configured to write data to the nonvolatile storage medium according to a write command from the host system and read data from the nonvolatile storage medium according to a read command from the host system. The storage device 3 may be either a Hard Disk Drive (HDD) or a Solid State Drive (SSD), but in the following, it is assumed that the storage device 3 is implemented as a Solid State Drive (SSD).

The storage device 3 may include a controller 4 such as a System-on-a-Chip (SoC), a NAND flash memory 5, and dynamic RAM (DRAM) 6A and 6B.

The controller 4 includes a front end for executing operations relating to interfacing with the host system 1 and a back-end for executing operations relating to control of the NAND flash memory 5.

The front end includes a host interface 21, a CPU 22, a buffer manager 23, a DRAM controller 24, a register 25, and the like. The host interface 21, the CPU 22, the buffer manager 23, and the register 25 are interconnected via a bus 20.

The host interface 21 receives various commands, data and the like from the host system 1 and includes four physical layer circuits (Phy 0, Phy 1, Phy 2, and Phy 3) 211 respectively corresponding to Port A, Port B, Port C, and Port D as a circuit configured to send a command completion response, data, and the like to the host system 1. In addition, the host interface 21 may include both a SAS controller 212 and a PCIe controller 213. In the case where the storage device 3 is implemented as a SAS device conforming to the SAS standard, the SAS controller 212 is enabled. On the other hand, in a case where the storage device 3 is implemented as a PCIe device conforming to the PCIe standard, the PCIe controller 213 is enabled.

The CPU 22 is a processor that controls the operations of components on the front end side. The buffer manager 23 controls the DRAM 6A as a buffer via the DRAM controller 24.

The register 25 holds capability information indicating several link rates supported by the storage device 3. For example, in the SAS standard, this capability information is called Phy Capabilities. The capability information stored in the register 25 is used to transmit this capability information to the host system 1 via the serial interface 2.

The back end includes a NAND controller 31, a CPU 32, a buffer manager 33, a DRAM controller 34, a NAND interface control circuit (NAND Phy) 35, and the like. The NAND controller 31, the CPU 32, and the buffer manager 33 are interconnected via the above-described bus 20. The CPU 32 is a processor that controls the operations of components on the back end side. The buffer manager 33 controls the DRAM 6B as a buffer via the DRAM controller 34. One DRAM may be shared by the front end and the back end.

The NAND controller 31 controls the NAND flash memory 5 via the NAND interface control circuit (NAND Phy) 35.

The sequence diagram shown in FIG. 2 shows an outline of the procedure of processing of determining the power throttling mode and the link rate. In the sequence diagram of FIG. 2, an outline of the procedure of processing of determining the power throttling mode and the link rate is shown by taking SAS as an example.

The host system 1 supplies operating power to the storage device 3 to power on the storage device 3 (step S10). When the storage device 3 is powered on, the controller 4 of the storage device 3 executes an initialization sequence including various preparatory processing for enabling the NAND flash memory 5 to operate, and various preparatory processing and the like necessary for enabling the host interface 21 to operate (step S11). In the related art, it is generally considered that this initialization sequence is an only trigger for setting the maximum power consumption. In the case of the related art where the maximum power consumption allowed for the storage device 3 is fixed, for example, in the case of SAS, power setting corresponding to the fastest 12 Gbps link rate requiring the highest maximum power consumption is performed in the initialization sequence. For example, if the maximum power consumption corresponding to the fastest link rate of 12 Gbps is 12 W, the value of the maximum power consumption of the storage device 3 is always set to 12 W.

In an embodiment, if a specific power throttling mode suitable for the user-specified mode is previously specified by the host system 1 in a preceding power cycle or the like, the controller 4 may set the maximum power consumption that matches this specific power throttling mode as the maximum power consumption of the storage device 3. In this way, in the initialization sequence, the maximum power consumption of the storage device 3 is limited to the maximum power consumption corresponding to the power throttling mode suitable for the current user-specified mode.

The host system 1 cooperates with the storage device 3 to execute a link reset sequence (Link Reset Sequence) for establishing a link (connection) between the host system 1 and the storage device 3 via the serial interface. The link reset sequence corresponds to a training phase (Training Phase) of NVMe.

In an embodiment, if the power throttling mode is previously specified by the host system 1 in the preceding power cycle or the like, the maximum power consumption that matches this specified power throttling mode may be set in this link reset sequence. In this way, the maximum power consumption of the storage device 3 is limited to the maximum power consumption corresponding to the power throttling mode suitable for the current user-specified mode.

In addition, if the link rate is previously specified by the host system 1 in the preceding power cycle or the like, the processing of changing the link rate to be used to the specified link rate is performed in the link reset sequence, and the maximum power consumption that matches the combination of the specified link rate and the specified power throttling mode may be set in this link reset sequence. In this way, it is possible to limit the maximum power consumption of the storage device 3 to the maximum power consumption corresponding to the combination of the specified link rate and the specified power throttling mode.

The host system 1 executes power throttling mode parameter determination processing as necessary (step S13). In this power throttling mode parameter determination processing, the host system 1 determines a power throttling mode suitable for the mode specified by the user based on the mode specified by the user and the correspondence relationship information about the link rate/maximum power consumption/power consumption efficiency.

In this power throttling mode parameter determination processing, the host system 1 may further determine a link rate suitable for the mode specified by the user based on not only the power throttling mode but also the mode specified by the user and the correspondence relationship information about the link rate/maximum power consumption/power consumption efficiency.

After executing power throttling mode parameter determination processing, in cooperation with the storage device 3, the host system 1 executes a power throttling sequence, the host system 1 instructs the storage device 3 to execute the power throttling operation corresponding to the determined power throttling mode (step S14).

In the power throttling sequence, the host system 1 sends mode specification information specifying the determined power throttling mode to the storage device 3. In this case, for example, in SAS, the host system 1 may instruct the storage device 3 the determined power throttling mode by updating a specific Mode Page (for example, specific vendor unique Mode Page) held in the storage device 3.

The host system 1 may specify either the timing of the initialization sequence or the timing of the reset sequence as the timing at which the storage device 3 changes the power throttling mode thereof to the power throttling mode specified by the host system 1. In this case, the host system 1 may further set two flags in this specific Mode Page.

One of the two flags indicates whether or not the power throttling operation based on the contents of this specific Mode Page is executed at the timing of the initialization sequence. The other of the two flags indicates whether or not the power throttling operation based on the contents of this specific Mode Page is executed at the timing of the reset sequence. By setting these flags, the host system 1 may cause the storage device 3 to execute the power throttling operation thereof in the power throttling mode instructed from the host system 1 at the timing of the initialization sequence or the timing of the reset sequence.

In the power throttling sequence, the host system 1 may transmit not only the mode specification information but also the link rate specification information specifying the determined link rate to the storage device 3. For example, in SAS, the host system 1 may notify the storage device 3 of the determined link rate by using a Mode Select command for changing Mode Page 19h (Subpage 01h) held in the storage device 3.

In Mode Page 19h (Subpage 01h), there is information (SAS phy mode descriptor list) defining the minimum link rate (Minimum Link Rate) and the maximum link rate (Maximum Link Rate). The maximum link rate (Maximum Link Rate) indicates the maximum value of the link rate that the storage device 3 is permitted to use, among the plural kinds of link rates supported by the storage device 3. The minimum link rate (Minimum Link Rate) indicates the minimum value of the link rate that the storage device 3 is permitted to use, among the plural kinds of link rates supported by the storage device 3.

For example, if the determined link rate is a link rate lower than the maximum link rate currently set in Mode Page 19h (Subpage 01h), the host system 1 may change the maximum link rate to the determined link rate by using the Mode Select command. Alternatively, the host system 1 may change both the current minimum link rate and the current maximum link rate based on the determined link rate.

FIG. 3 shows an example of a mode that may be specified by the user.

Through the user interface displayed on the display by the setting application program 121A, the user may specify any one of a performance mode (Performance Mode), a power consumption reduction mode (Power Consumption Reduction Mode), and a peak power reduction mode (Peak Power Reduction Mode).

The performance mode (Performance Mode) is the above-described first mode that gives priority to performance. If the performance mode (Performance Mode) is specified by the user, the host system 1 selects a power throttling mode (the above-described first power throttling mode) that gives the highest priority to performance as the power throttling mode suitable for the performance mode (Performance Mode) based on correspondence relationship information about the link rate/maximum power consumption/power consumption efficiency of the storage device 3 among the power throttling modes supported by the storage device 3.

The power consumption reduction mode (Power Consumption Reduction Mode) is the above-mentioned second mode that gives priority to reduction of power consumption. If the power consumption reduction mode (Power Consumption Reduction Mode) is specified by the user, the host system 1 selects a power throttling mode having higher power consumption efficiency, more specifically, a power throttling mode that minimizes the total power consumption as a power throttling mode suitable for the power consumption reduction mode based on correspondence relationship information about the link rate/maximum power consumption/power consumption efficiency of the storage device 3 among the power throttling modes supported by the storage device 3.

The peak power reduction mode (Peak Power Reduction Mode) is the above-described third mode that gives priority to reduction of peak power. The peak power reduction mode (Peak Power Reduction Mode) is used to prevent the peak power from reaching a certain value or more. In a case where the peak power reduction mode (Peak Power Reduction Mode) is specified by the user, the user may further specify the upper limit of the peak power within a valid range.

In a case where the peak power reduction mode (Peak Power Reduction Mode) is specified by the user, the host system 1 selects a power throttling mode that gives priority to reduction of peak power (i.e., the above-described second power throttling mode) as the power throttling mode suitable for the peak power reduction mode (Peak Power Reduction Mode) based on correspondence relationship information about the link rate/maximum power consumption/power consumption efficiency of the storage device 3 among the power throttling modes supported by the storage device 3.

FIG. 4 shows an example of correspondence relationship information about the link rate/maximum power consumption/power consumption efficiency of the storage device 3.

This information indicates a correspondence relationship between a link rate, maximum power consumption, and power consumption efficiency in a case where the storage device 3 is set to a first power throttling mode (Power_Level_Mode (A)), and a correspondence relationship between a link rate, maximum power consumption, and power consumption efficiency in a case where the storage device 3 is set to a second power throttling mode (Power_Level_Mode (B))

In FIG. 4, as an example, a case where the serial interface 2 includes two ports (Port A and Port B) is shown. As described above, the correspondence relationship information in FIG. 4 may be acquired by the host system 1 by measuring the link rate, power consumption, and the like of the storage device 3 or may be acquired from the storage device 3 by the host system 1 via the interface of the storage device 3 such as Mode Page or Get Feature.

An example of the setting values is shown in the respective columns of FIG. 4. In the example of FIG. 4, in the first power throttling mode (Power_Level_Mode (A)) that gives priority to performance and the second power throttling mode (Power_Level_Mode (B)) that gives priority to reduction of peak power, the power throttling setting value (maximum power consumption) in a case where the link rate of 12 Gbps is included is different depending on whether priority is given to performance or reduction of peak power.

As shown in the upper part of FIG. 4, in the correspondence relationship information corresponding to the first power throttling mode (Power_Level_Mode (A)) that gives priority to performance, a correspondence relationship between the power throttling setting value (maximum power consumption), the power consumption efficiency (IOPS/W), and a performance ratio is defined for each combination of the link rates of the two ports (Port A and Port B).

As shown in the lower part of FIG. 4, also in the correspondence relationship information corresponding to the second power throttling mode (Power_Level_Mode (B)) that gives priority to reduction of peak power, a correspondence relationship between the power throttling setting value (maximum power consumption), the power consumption efficiency (IOPS/W), and a performance ratio is defined for each combination of the link rates of the two ports (Port A and Port B).

In the first power throttling mode (Power_Level_Mode (A)) that gives priority to performance, the maximum power consumption is set to 9 W at Port A and Port B at link rates of 6 Gbps and 6 Gbps, respectively. In this case, the power consumption efficiency (IOPS/W) is a certain value "A". For the combination of one of Port A and Port B with a link rate of 6 Gbps and the other with a link rate of 12 Gbps, the maximum power consumption is set to 12 W. In this case, the power consumption efficiency (IOPS/W) is a certain value "B". For the combination of Port A and Port B with respective link rates of 12 Gbps and 12 Gbps, the maximum power consumption is set to 12 W. In this case, the power consumption efficiency (IOPS/W) is a certain value "D".

In the second power throttling mode (Power_Level_Mode (B)) that gives priority to reduction of peak power, the maximum power consumption is set to 9 W at Port A and Port B at link rates of 6 Gbps and 6 Gbps, respectively. In this case, the power consumption efficiency (IOPS/W) is a value "A". For the combination of one of Port A and Port B with a link rate of 6 Gbps and the other with a link rate of 12 Gbps, the maximum power consumption is set to 9 W. In this case, the power consumption efficiency (IOPS/W) is a certain value "C". For the combination of Port A and Port B with respective link rates of 12 Gbps and 12 Gbps, the maximum power consumption is set to 9 W. In this case, the power consumption efficiency (IOPS/W) is a certain value "E".

In FIG. 4, it is assumed that the magnitude relation of the power consumption efficiency A, B, C, D, and E is A<B<C<D<E. However, this magnitude relation is merely an example, and if the performance of the storage device 3 is remarkably deteriorated in a case where a combination of 12 Gbps, 12 Gbps, 9 W is used, for example, the power consumption efficiency (IOPS/W) corresponding to the combination of 12 Gbps, 12 Gbps, and 9 W may be lower than the power consumption efficiency (IOPS/W) corresponding to the combination of 12 Gbps, 12 Gbps, and 12 W. In this case, as shown in the parentheses in FIG. 4, the power consumption efficiency (IOPS/W) corresponding to the combination of 12 Gbps, 12 Gbps, and 9 W is "D", and the power consumption efficiency (IOPS/W) corresponding to the combination of 12 Gbps, 12 Gbps, and 12 W is "E".

As described above, the power consumption efficiency (IOPS/W) corresponding to the plurality of combinations of the link rate and the maximum power consumption respectively differs for each model of the storage device used as the storage device 3.

In order to reduce the power consumption of the storage device 3, it is preferable to consider not only the power throttling setting value (maximum power consumption) but also power consumption efficiency. If the power consumption efficiency is simply better in the second power throttling mode (Power_Level_Mode (B)) than in the first power throttling mode (Power_Level_Mode (A)), in a case where Power Consumption Reduction Mode is specified by the user, simply the second power throttling mode (Power_Level_Mode (B)) may be selected. However, sometimes that is not the case, that is, power consumption efficiency is better in the mode that gives priority to performance. Therefore, it is necessary to select a power throttling mode having higher power consumption efficiency from among the first power throttling mode (Power_Level_Mode (A)) and the second power throttling mode (Power_Level_Mode (B)).

In addition, in order to select a power throttling mode suitable for the Power Consumption Reduction Mode more precisely, the number of I/Os to be processed which are stored in the I/O queue 124B may be taken into consideration.

Here, the number of I/Os to be processed means the number of I/Os (I/O requests) to be sent to the storage device 3. For example, in a case where the number of I/Os to be processed is relatively small, limiting the maximum power consumption of the storage device 3 to a relatively high maximum power consumption corresponding to the first power throttling mode (Power_Level_Mode (A)) sometimes may reduce the total power consumption required for the number of I/Os to be processed. Therefore, by considering the number of I/Os to be processed, it is possible to select a power throttling mode suitable for Power Consumption Reduction Mode more accurately.

The flowchart of FIG. 5 shows a procedure of power throttling mode determination processing executed by the host system 1.

As described above, the CPU 11 of the host system 1 functions as a controller that controls the behavior of the storage device 3. The CPU 11 executes the power throttling mode setting module 124A to perform the following power throttling mode determination processing. In the power throttling mode determination processing, it is assumed that one of the modes shown in FIG. 3 is specified by the user to the host system 1 and the host system 1 has acquired the correspondence relationship information shown in FIG. 4 by measurement or acquisition from the storage device 3.

The CPU 11 determines whether the mode (power consumption mode) specified by the user is the performance mode (Performance Mode), the power consumption reduction mode (Power Consumption Reduction Mode), or the peak power reduction mode (Peak Power Reduction Mode) (step S21).

If the mode specified by the user is the performance mode (Performance Mode), based on the correspondence relationship information shown in FIG. 4, the CPU 11 determines a power throttling mode having higher maximum power consumption, that is, the first power throttling mode (here, Power_Level_Mode (A)) that performs power throttling with performance prioritized as the power throttling mode suitable for the mode (Performance Mode) specified by the user (step S22).

If the mode specified by the user is the peak power reduction mode (Peak Power Reduction Mode), based on the correspondence relationship information shown in FIG. 4, the CPU 11 determines a power throttling mode having lower maximum power consumption, that is, the second power throttling mode (Power_Level_Mode (B)) that performs power throttling with reduction of peak power prioritized as the power throttling mode (here, Peak Power Reduction Mode) suitable for the mode specified by the user (step S23).

As described above, it is preferable to select Power_Level_Mode (A) that performs power throttling with performance prioritized in a case where the mode specified by the user is Performance Mode and to select Power_Level_Mode (B) that performs power throttling with reduction of peak power prioritized in a case where the mode specified by the user is Peak Power Reduction Mode, but in a case where Power Consumption Reduction Mode is specified by the user, it is preferable to consider not only the power throttling setting value (maximum power consumption) but also power consumption efficiency. This is because even in a case where the maximum power consumption used is sufficiently low, if this greatly reduces storage performance, the power consumption efficiency of the storage device 3 is lowered and as a result the total power consumption of the storage device 3 may not be reduced.

Therefore, in a case where Power Consumption Reduction Mode is specified by the user, the CPU 11 determines a power throttling mode with high power consumption efficiency as the power throttling mode suitable for the mode specified by the user (here, Power Consumption Reduction Mode) based on the correspondence relationship information shown in FIG. 4 among Power_Level_Mode (A) and Power_Level_Mode (B).

More specifically, based on the correspondence relationship information in FIG. 4, the CPU 11 determines whether or not Power_Level_Mode (B) has higher power consumption efficiency than Power_Level_Mode (A) (step S24). In step S24, the CPU 11 may select a combination having the highest power consumption efficiency (IOPS/W) from among all combinations of the link rate and the maximum power consumption and determine a power throttling mode to which the selected combination belongs as a power throttling mode having higher power consumption efficiency.

For example, as shown in FIG. 4, if the power consumption efficiency corresponding to a combination of (12 Gbps, 12 Gbps, and 12 W) belonging to Power_Level_Mode (A) is D and the power consumption efficiency corresponding to a combination of (12 Gbps, 12 Gbps, and 9 W) belonging to Power_Level_Mode (B) is E (>D), the CPU 11 determines that Power_Level_Mode (B) has higher power consumption efficiency.

However, depending on the model of the storage device used as the storage device 3, in a case where the combination of (12 Gbps, 12 Gbps, and 9 W) is used, performance is significantly reduced. Therefore, as described in the parentheses in FIG. 4, the power consumption efficiency corresponding to the combination of (12 Gbps, 12 Gbps, and 12 W) belonging to Power_Level_Mode (A) can be E and the power consumption efficiency corresponding to the combination of (12 Gbps, 12 Gbps, and 9 W) belonging to Power_Level_Mode (B) can be D. In this case, the CPU 11 determines that the Power_Level_Mode (A) having the highest maximum power to be used has higher power consumption efficiency.

If Power_Level_Mode (B) has higher power consumption efficiency than Power_Level_Mode (A) (Yes in step S24), the CPU 11 determines Power_Level_Mode (B) that performs power throttling with reduction of peak power prioritized as a power throttling mode suitable for the mode (here, Power Consumption Reduction Mode) specified by the user (step S23).

On the other hand, if Power_Level_Mode (B) does not have higher power consumption efficiency than Power_Level_Mode (A), that is, Power_Level_Mode (A) has higher power consumption efficiency than Power_Level_Mode (B) (No in step S24), the CPU determines Power_Level_Mode (A) that performs power throttling with performance prioritized as a power throttling mode (here, Power Consumption Reduction Mode) suitable for the mode specified by the user (step S22).

The flowchart of FIG. 6 shows another procedure of power throttling mode determination processing executed by the host system 1.

In the flowchart of FIG. 6, the power throttling mode to be used is determined by considering not only the power consumption efficiency but also the number of I/Os to be processed stored in the I/O queue 124B. In the flowchart of FIG. 6, the processing of step S25 is added after the processing of step S24 of FIG. 5.

If Power_Level_Mode (B) has higher power consumption efficiency than Power_Level_Mode (A) (Yes in step S24), the CPU 11 determines Power_Level_Mode (B) that performs power throttling with reduction of peak power prioritized as a power throttling mode suitable for the mode (here, Power Consumption Reduction Mode) specified by the user (step S23).

On the other hand, if Power_Level_Mode (B) does not have higher power consumption efficiency than Power_Level_Mode (A), that is, Power_Level_Mode (A) has higher power consumption efficiency than Power_Level_Mode (B) (No in step S24), the CPU determines whether a temporary operation in Power_Level_Mode (A) may reduce the total power consumption required for the number of I/Os to be processed based on the number of I/Os to be processed, the power consumption efficiency of Power_Level_Mode (A), and the power consumption efficiency of Power_Level_Mode (B) (step S25).

In step S25, for each of Power_Level_Mode (A) and Power_Level_Mode (B), from the [number of I/Os to be processed]/[power consumption efficiency (IOPS/W)], the CPU 11 calculates the total power consumption required for the number of I/Os to be processed and specifies a power throttling mode in which the total power consumption required for the number of I/Os to be processed is low.

If the total power consumption required for the number of I/Os to be processed is low when Power_Level_Mode (A) is used (Yes in step S25), Power_Level_Mode (A) that performs power throttling with performance prioritized is determined as a power throttling mode suitable for the mode (here, Power Consumption Reduction Mode) specified by the user (step S22).

On the other hand, if the total power consumption required for the number of I/Os to be processed is low when Power_Level_Mode (B) is used (No in step S25), Power_Level_Mode (B) that performs power throttling with reduction of the peak power prioritized is determined as a power throttling mode suitable for the mode (here, Power Consumption Reduction Mode) specified by the user (step S23).

In steps S22 and S23 described with reference to FIGS. 5 and 6, based on the user-specified mode and the correspondence relationship information in FIG. 4, the CPU 11 may determine not only the power throttling mode to be used but also the link rate to be used. For example, in a case where the mode specified by the user is Power Consumption Reduction Mode, the CPU 11 may determine the link rate included in the combination having the highest power consumption efficiency as the link rate to be used out of all the combinations of the link rate and the maximum power consumption. For example, in a case where the mode specified by the user is Performance Mode, the CPU 11 may determine the link rate included in the combination having the highest performance as the link rate to be used out of all the combinations of the link rate and the maximum power consumption. In a case where the mode specified by the user is Peak Power Reduction Mode, the CPU 11 may determine the link rate corresponding to the combination having the lowest limited maximum power consumption as the link rate to be used out of all the combinations of the link rate and the maximum power consumption.

Figure 7:
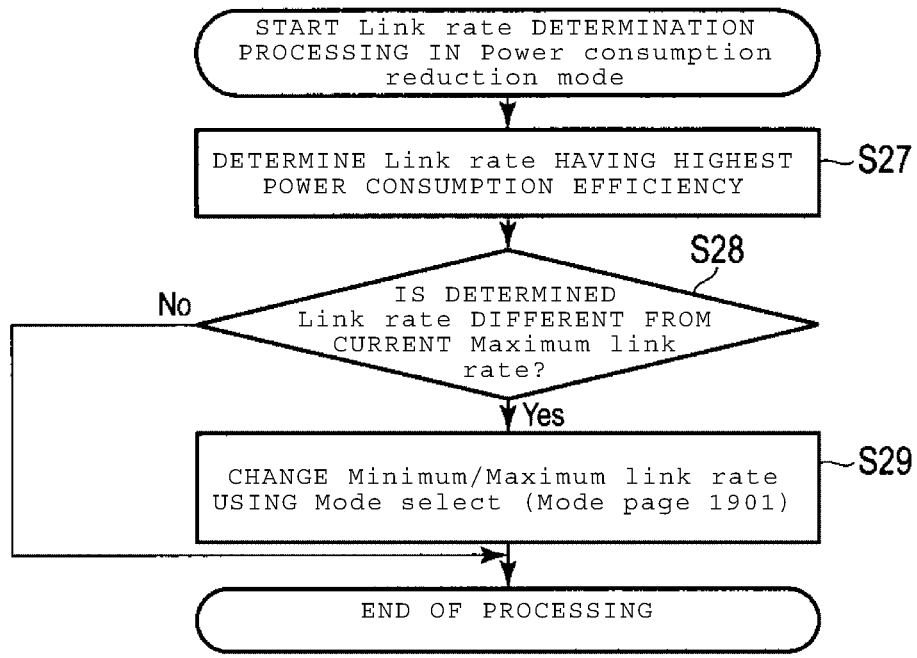
FIG. 7 is a flowchart showing a procedure of link rate determination processing executed by the host system.

The flowchart of FIG. 7 shows a procedure of link rate determination processing executed by the host system 1.

In FIG. 7, as an example, a procedure of the link rate determination processing in a case where Power Consumption Reduction Mode is specified by the user is shown.

Based on the correspondence relationship information in FIG. 4, the CPU 11 determines a link rate having the highest power consumption efficiency (step S27). In step S27, for example, the CPU 11 selects a combination having the highest power consumption efficiency out of all the combinations of the link rate and the maximum power consumption and determines the link rate included in the selected combination as a link rate having the highest power consumption efficiency. The CPU 11 notifies the storage device 3 of the link rate specification information specifying the determined link rate.

In this case, only in a case where the determined link rate is different from the current maximum link rate (Maximum Link Rate) held in the storage device 3, the CPU 11 may transmit the link rate specification information specifying the determined link rate to the storage device 3 to change the current maximum link rate.

For example, when SAS is taken as an example, if the determined link rate is different from the current maximum link rate (Maximum Link Rate) (No in step S28), the CPU 11 changes the maximum link rate currently set in Mode Page 19h (Subpage 01h) to the determined link rate by using the Mode Select command (step S29). In step S29, the CPU 11 may send to the storage device 3 the Mode Select command including link rate specification information specifying both the minimum link rate and the maximum link rate. The maximum link rate specified by link rate specification information indicates the above-determined link rate. The minimum link rate specified by link rate specification information may be the same link rate as the minimum link rate currently set in Mode Page 19h (Subpage 01h).

FIG. 8 shows an example of a mode page used for setting the determined power throttling mode in the storage device 3.

Here, an example of the interface for setting the power throttling mode will be described by taking SAS as an example. In SAS, it is common to implement tuning of various operations of the storage device 3 by the Mode Select command. In setting the power throttling mode in an embodiment, a mode page having a vendor unique PAGE CODE may be used as an interface for setting the power throttling mode. In FIG. 8, as an example, a vendor unique mode page with PAGE CODE (36h) is shown.

Various mode pages are held in, for example, a DRAM or the like of the storage device 3. The mode page of PAGE CODE (36h) shown in FIG. 8 is one of these mode pages.

In the mode page of PAGE CODE (36h), for example, a bit 7 of byte 2 is used as "Init_Set_En" bit, a bit 6 of byte 2 is used as "LR_Set_En" bit, and a bit 5 to a bit 0 of byte 2 is used to specify "Power_Level_Mode".

The "Init_Set_En" bit specifies whether or not to execute power throttling specified by "Power_Level_Mode" of this page in the initialization sequence. The value (0b or 1b) of the "Init_Set_En" bit indicates the following.

0b: Do not execute the power throttling specified by "Power_Level_Mode" of this Page in the initialization sequence.

1b: Execute the power throttling specified by "Power_Level_Mode" of this Page in the initialization sequence.

The "LR_Set_En" bit specifies whether or not to execute the power throttling specified by "Power_Level_Mode" of this page in the link reset sequence. The value (0b or 1b) of the "LR_Set_En" bit indicates the following.

0b: Do not execute the power throttling specified by "Power_Level_Mode" of this Page in the link reset sequence.

1b: Execute the power throttling specified by "Power_Level_Mode" of this Page in the link reset sequence.

In a case where the storage device 3 is a model using hardware in which it is difficult to change the power setting during operation, the CPU 11 sets Init_Set_En=1b and LR_Set_En=0b, after powering off the storage device 3 and executes a power cycle of powering on again, thereby causing the storage device 3 to refer to this page in the initialization sequence. In this way, at the timing of the initialization sequence of the storage device 3, it is possible to change the power throttling mode of the storage device 3 to the power throttling specified by "Power_Level_Mode".

In the case where it is desired to change the power setting of the storage device 3 while the power is on, the CPU 11 sets LR_Set_En=1b. In this way, at the timing of the link reset sequence, it is possible to change the power throttling mode of the storage device 3 to the power throttling specified by "Power_Level_Mode".

"Power_Level_Mode" specifies the above-described Power_Level_Mode (A) or Power_Level_Mode (B).

The contents of "Init_Set_En", "LR_Set_En", and "Power_Level_Mode" may be changed by the Mode select command.

Figure 9:
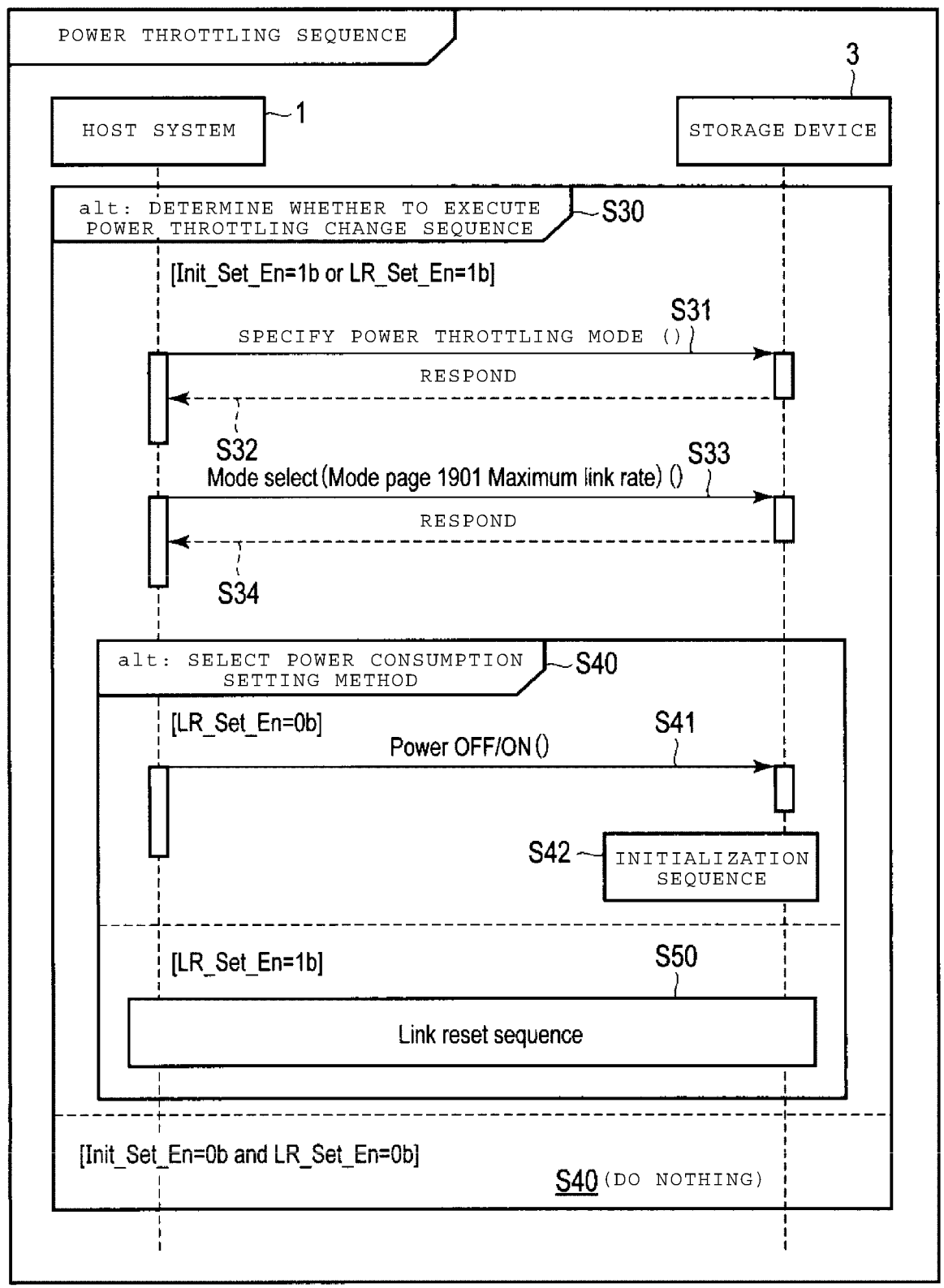
FIG. 9 is a sequence diagram showing a procedure of processing since the host system sets a power throttling mode to the storage device until the storage device executes a power setting corresponding to the power throttling mode.

FIG. 9 shows a procedure of processing since the host system 1 sets a power throttling mode in the storage device 3 until the storage device 3 executes the power setting corresponding to the power throttling mode.

The sequence diagram of FIG. 9 shows the processing within the power throttling sequence described in step S14 of FIG. 2.

Based on the settings of "Init_Set_En" and "LR_Set_En", the CPU 11 of the host system 1 determines whether or not it is necessary to execute the power throttling change sequence (step S30). In the case of "Init_Set_En"=1b or "LR_Set_En"=1b, the following processing is executed by the CPU 11 of the host system 1 and the controller 4 in the storage device 3.

The CPU 11 sets the determined power throttling mode (Power_Level_Mode (A) or Power_Level_Mode (B)) in the "Power_Level_Mode" field of the mode page of PAGE CODE (36h) and instructs the storage device 3 to operate in the determined power throttling mode (step S31). The controller 4 of the storage device 3 returns a response to the host system 1 (step S32).

In a case where the determined link rate is different from the current maximum link rate (Maximum Link Rate) held in the storage device 3, the CPU 11 changes the maximum link rate currently set in Mode Page 19h (Subpage 01h) to the determined link rate by using the Select command (step S33). The controller 4 of the storage device 3 returns a response to the host system 1 (step S34).

Next, the CPU 11 determines whether to change the power setting of the storage device 3 at the timing of the initialization sequence or the link reset sequence (step S40).

In the case of changing the power setting of the storage device 3 in the initialization sequence, that is, in the case of "LR_Set_En"=0b, the CPU 11 executes a power cycle of powering on again after powering off the storage device 3 (step S41). When the storage device 3 is powered on, the controller 4 of the storage device 3 starts an initialization sequence (step S42).

Figure 10:
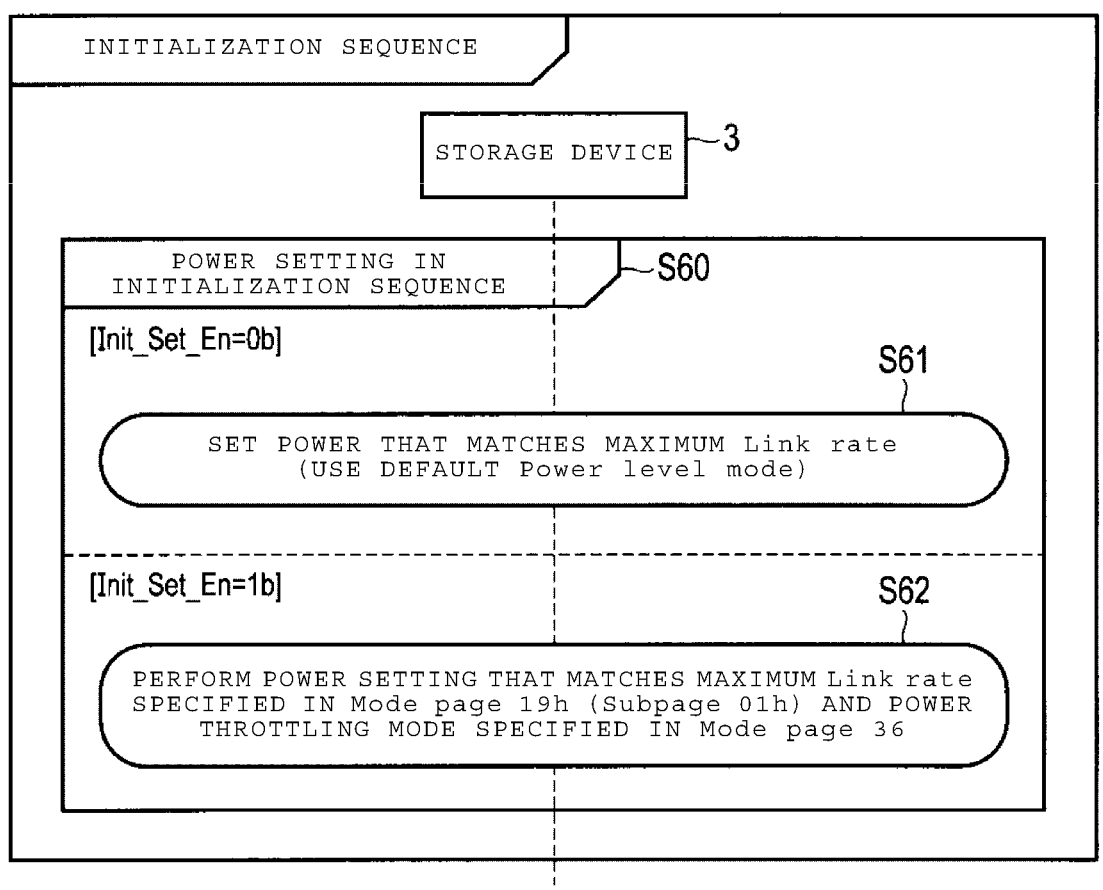
FIG. 10 is a sequence diagram showing a procedure of power setting processing executed in an initialization sequence of the storage device.

In this initialization sequence, as shown in FIG. 10, the controller 4 refers to "Init_Set_En" of the mode page of PAGE CODE (36h) (that is, mode page 36h) and determines whether "Init_Set_En" is 0b or 1b (step S42).

In the case of "Init_Set_En"=0b, the controller 4 sets the maximum power consumption allowed for the storage device 3 to a maximum power consumption that matches the maximum link rate currently set in Mode Page 19h (Subpage 01h) (step S61). In step S61, if a default power throttling mode is Power_Level_Mode (A), the controller 4 may select maximum power consumption that conforms to the current maximum link rate from among the several maximum power consumption usable in the Power_Level_Mode (A) and set the maximum power consumption allowed for the storage device 3 to the selected maximum power consumption.

In the case of "Init_Set_En"=1b, the controller 4 sets the maximum power consumption allowed for the storage device 3 to a maximum power consumption that matches a combination of the maximum link rate currently set in Mode Page 19h (Subpage 01h) and the power throttling mode specified in the mode page 36h (Subpage 01h) (step S62). Then, hereinafter, the controller 4 controls the operation of the storage device 3 by using the maximum link rate currently set in Mode Page 19h (Subpage 01h) and the power throttling mode specified in the mode page 36h.

Returning to FIG. 9, in a case where changing the power setting of the storage device 3 is executed in the link reset sequence, that is, in the case of "LR_Set_En"=1b, the CPU 11 starts the link reset sequence again in order to re-establish the link between the host system 1 and the storage device 3 via the serial interface 2 (step S50). In step S50, the controller 4 of the storage device 3 sets the maximum power consumption allowed for the storage device 3 to a maximum power consumption that matches a combination of the maximum link rate currently set in Mode Page 19h (Subpage 01h) and the power throttling mode specified in the mode page 36h (Subpage 01h) (step S62). Then, hereinafter, the controller 4 controls the operation of the storage device 3 by using the maximum link rate currently set in Mode Page 19h (Subpage 01h) and the power throttling mode specified in the mode page 36h.

In the case of Init_Set_En "=0b and LR_Set_En"=0b, the CPU 11 of the host system 1 does not execute any processing related to power setting (step S40).

Figure 11:
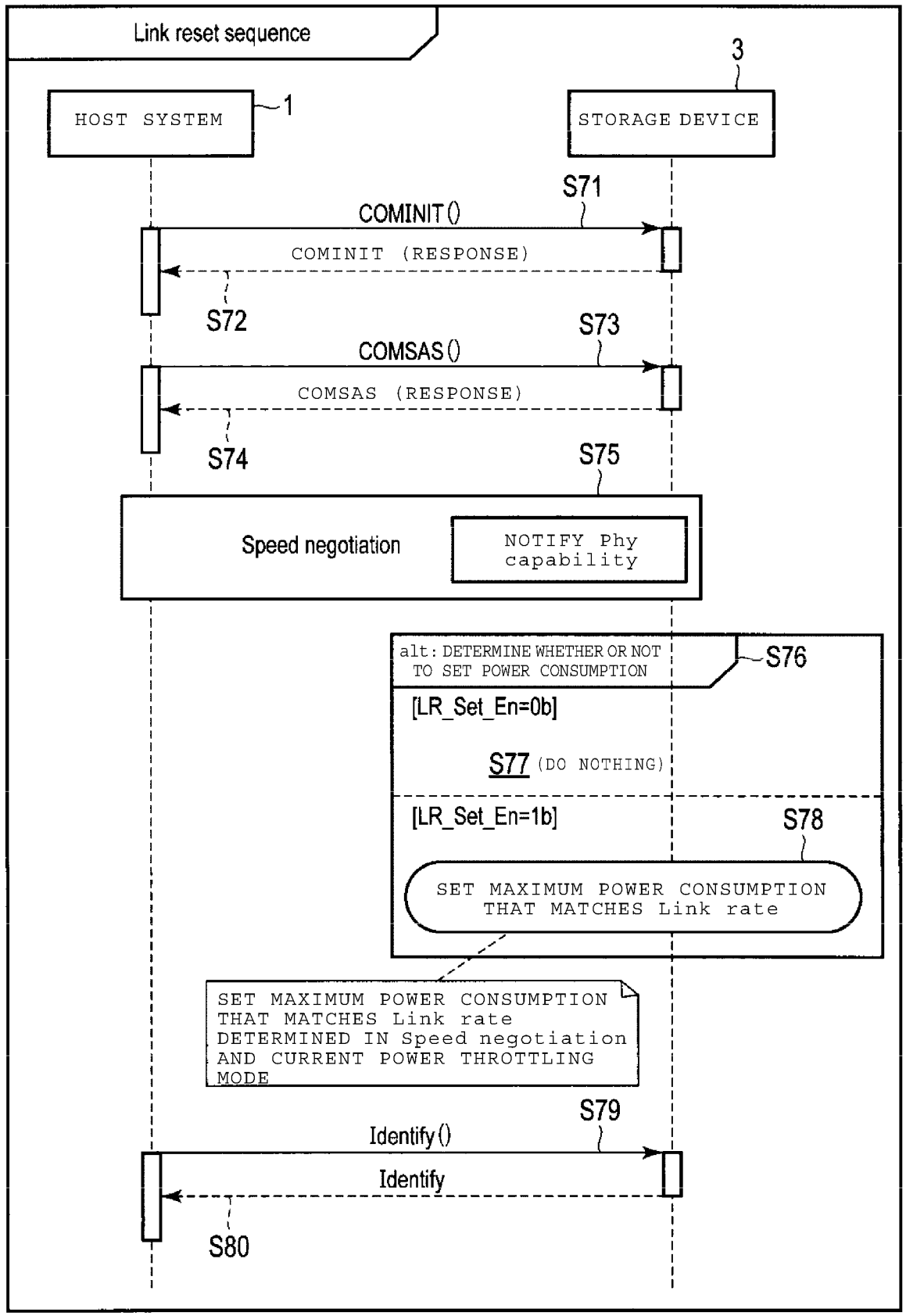
FIG. 11 is a sequence diagram showing a procedure of power setting processing executed within a link reset sequence executed by the host system and the storage device.

FIG. 11 shows a procedure of the power setting processing performed within the reset sequence executed by the host system 1 and the storage device 3.

FIG. 11 shows at which timing power throttling is to be performed within the link reset sequence of SAS. FIG. 11 shows a flow of changing the power setting at a stable timing when no packet is exchanged immediately before the link is established by the Identify exchange.

First, the CPU 11 of the host system 1 transmits a signal (COMINT) for confirming the presence or absence of a partner device via the serial interface 2 (step S71). If the storage device 3 is connected to the serial interface 2, the controller 4 of the storage device 3 returns a signal (CO- MINT) to the host system 1 via the serial interface 2 in order to notify the host system 1 that the storage device 3 is present (step S72).

Next, the CPU 11 transmits a signal (COMSAS) for confirming whether or not the partner device is a SAS device via the serial interface 2 (step S73). If the storage device 3 is a SAS device, the controller 4 of the storage device 3 returns a signal (COMSAS) to the host system 1 via the serial interface 2 in order to notify the host system 1 that the storage device 3 is a SAS device (step S74).

Next, the CPU 11 executes speed negotiation for determining the link rate to be used in cooperation with the storage device 3 (step S75). In the processing of speed negotiation, the controller 4 of the storage device 3 performs Phy Capability notification processing of sending capability information (Phy Capabilities) indicating the minimum link rate and the maximum link rate of the storage device 3 to the host system 1. In the processing of speed negotiation, for example, the operation of confirming whether or not the data transfer may be normally executed may be executed while gradually increasing the link rate from the minimum link rate of the storage device 3 to the maximum link rate. In this case, a link rate to be used for data transfer between the host system 1 and the storage device 3 is determined by the fastest link rate at which it is confirmed that data transfer may be executed normally. In this way, the link rate to be used may be limited to the maximum link rate of the storage device 3. In the present embodiment, as explained with reference to FIG. 9, since the maximum link rate set in Mode Page 19h (Subpage 01h) may be changed to a link rate suitable for the user-specified mode, the capability information (Phy Capabilities) indicating the maximum link rate suitable for the user-specified mode may be sent from the storage device 3 to the host system 1. Therefore, it is possible to use the link rate suitable for the user-specified mode.

No packet is exchanged during the period from the end of the speed negotiation to the exchange of the Identify. At this stable timing, the controller 4 of the storage device 3 may change the power setting.

That is, first, the controller 4 refers to LR_Set_En of the mode page 36h to determine whether or not it is necessary to set power consumption (step S76).

In the case of LR_Set_En=1b, the controller 4 does not execute any processing related to power setting (step S77).

In the case of LR_Set_En=1b, the controller 4 sets the maximum power consumption allowed for the storage device 3 to a maximum power consumption suitable for the combination of the link rate determined by speed negotiation and the power throttling mode specified by "Power_Level_Mode" of the mode page 36h (step S78).

Thereafter, an identifier that may uniquely identify the host system 1 and an identifier that may uniquely identify the storage device 3 are exchanged between the host system 1 and the storage device 3 (steps S79 and S80), and as a result, a connection (link) between the host system 1 and the storage device 3 is established.

Figure 12:
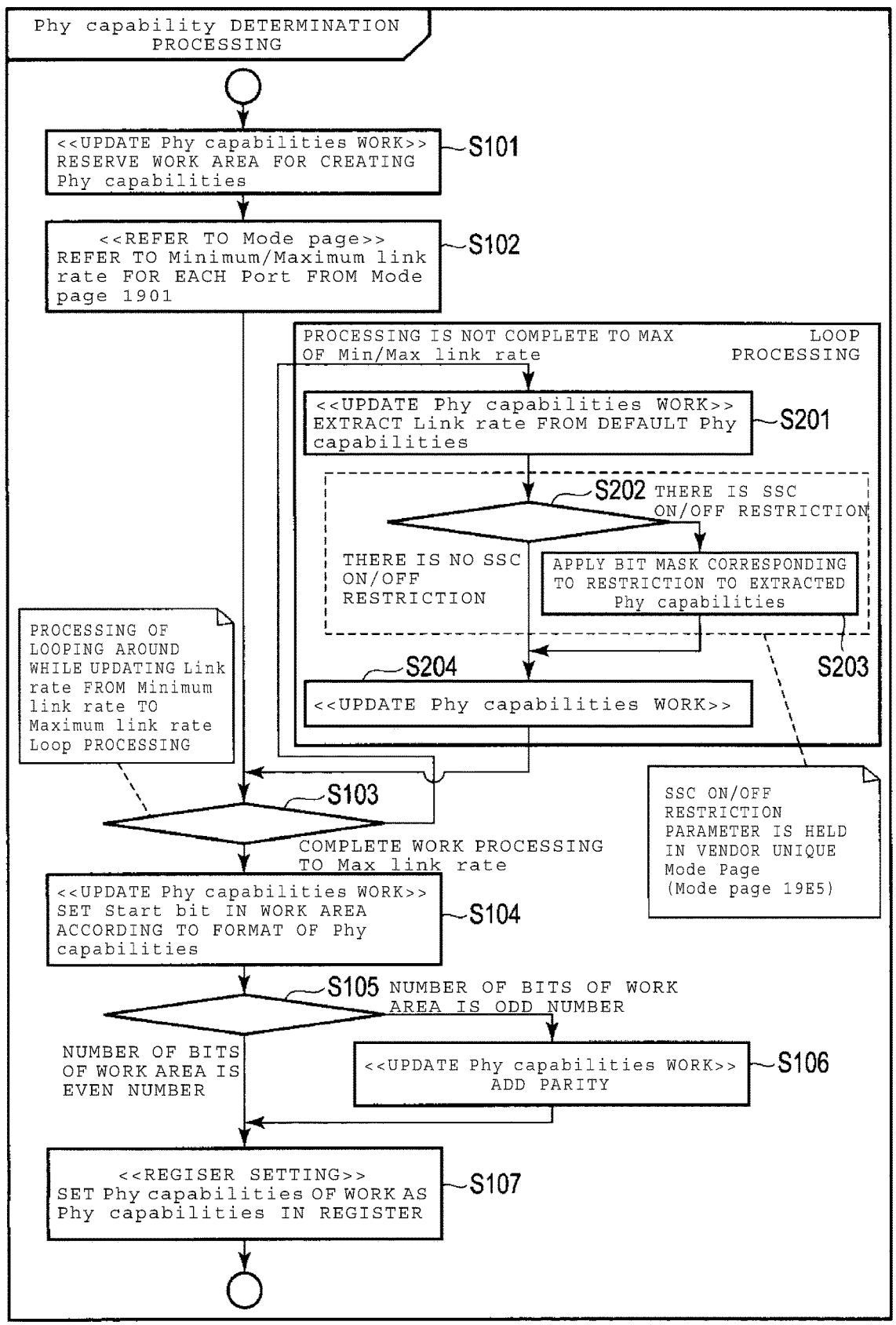
FIG. 12 is a flowchart showing a procedure of Phy capabilities control processing executed by the storage device.

The flowchart of FIG. 12 shows a procedure of Phy capabilities control processing executed by the storage device 3.

This Phy capabilities control processing is executed in order to generate appropriate capability information (Phy Capabilities) in consideration of the maximum/minimum link rate set in Mode Page 19h (Subpage 01h).

First, the controller 4 of the storage device 3 reserves a work area for creating Phy Capabilities on a memory such as the DRAM 6A (step S101).

Next, the controller 4 refers to the minimum link rate and the maximum link rate of each port through Mode Page 19h (Subpage 01h) (step S102). As shown in FIG. 13, in Mode Page 19h (Subpage 01h), there is information (SAS phy mode descriptor list) defining the minimum link rate (Minimum Link Rate) and the maximum link rate (Maximum Link Rate) of each port. In SAS Phy mode descriptor list, SAS phy mode descriptor list (first) indicates the minimum link rate (Minimum Link Rate) and the maximum link rate (Maximum Link Rate) of the first Port 1 (for example, Port A in FIG. 4). Similarly, SAS phy mode descriptor list (Last) indicates the minimum link rate (Minimum Link Rate) and the maximum link rate (Maximum Link Rate) of the last Port n (for example, Port B in FIG. 4).

The controller 4 executes loop processing of updating the default capability information (Phy Capabilities) while gradually updating the link rate to be processed from the minimum link rate to the maximum link rate (step S103).

Default capability information (Phy Capabilities) indicates a plurality of link rates supported by the hardware of the storage device 3. In the SAS, capability information (Phy Capabilities) shown in FIG. 14 is defined. "G1 WITHOUT SSC" and "G1 WITH SSC" are the capability bits related to the link rate of 1.5 Gbps corresponding to generation 1 (G1). "G2 WITHOUT SSC" and "G2 WITH SSC" are the capability bits related to the link rate of 3 Gbps corresponding to generation 2 (G2). "G3 WITHOUT SSC" and "G3 WITH SSC" are the capability bits related to the link rate of 6 Gbps corresponding to generation 3 (G3). "G4 WITHOUT SSC" and "G4 WITH SSC" are the capability bits related to the link rate of 12 Gbps corresponding to generation 4 (G4). Here, WITHOUT SSC indicates that there is no capability to perform frequency spreading on the signal (SSC: Spread Spectrum Clocking), and WITH SSC indicates that there is the capability to perform frequency spreading on the signal (SSC: Spread Spectrum Clocking).

For example, if the storage device 3 supports all of the four link rates of 1.5 Gbps, 3 Gbps, 6 Gbps, and 12 Gbps and has the capability to perform frequency spreading on the signals at all the link rates, in default capability information (Phy Capabilities), eight capability bits respectively corresponding to "G1 WITHOUT SSC", "G1 WITH SSC", "G2 WITHOUT SSC", "G2 WITH SSC", "G3 WITHOUT SSC", "G3 WITH SSC", "G4 WITHOUT SSC", and "G4 WITH SSC" are set to 1.

In the loop processing of step S103, the controller 4 executes processing of masking each of the other bits excluding the capability bits belonging to the range defined by the minimum link rate and the maximum link rate out of the eight capability bits in the default capability information (Phy Capabilities). For example, in a case where the maximum link rate is changed to 6 Gbps by the link rate specification information from the host system 1, the controller 4 masks the two capability bits corresponding to "G4 WITHOUT SSC" and "G4 WITH SSC", respectively and sets these capability bits to 0.

The loop processing in step S103 is executed by repeating the processing in steps S201, S202, S203, and S204.

In step S201, the controller 4 extracts capability bits (2 bits corresponding to WITH SSC and WITHOUT SSC respectively) corresponding to a link rate to be processed from the default capability information (Phy Capabilities). In step S202, based on the SSC ON/OFF restriction parameter held in the vendor unique mode page (for example, Mode Page 19E5), the controller 4 determines whether or not ON/OFF restriction of the SSC with respect to the link rate to be processed is necessary, that is, whether or not frequency spreading is performed on the signal (step S202). The SSC ON/OFF restriction parameter is information for indicating whether or not frequency spreading is to be performed on the signal. In a case where frequency spreading of the signal is not performed, in step S203, the controller 4 masks the capability bit corresponding to WITH SSC out of the two extracted capability bits (WITH SSC and WITHOUT SSC) and sets this capability bit to 0. In other words, the controller 4 masks the bit (capability bit corresponding to WITH SSC) indicating the capability of executing the frequency spreading of the signal and updates the two extracted capability bits (WITH SSC and WITHOUT SSC). In the case of performing signal frequency spreading, the processing of step S203 is skipped.

In step S204, the controller 4 updates the contents of the work area based on the mask result.

By repeating the processing of steps S201, S202, S203, and S204, new capability information is created on the work area.

When the loop processing in step S103 is completed, the controller 4 sets a start bit of "1" in the work area according to the format of the capability information (Phy Capabilities) in FIG. 14 (step S104). In other words, the controller 4 inserts a start bit of "1" at the head of new capability information on the work area.

Then, the controller 4 determines whether the number of bits of "1" included in the new capability information on the work area, that is, the number of bits of "1" included in the work area is an even number or an odd number (step S105). If the number of bits of "1" included in the work area is an odd number, the controller 4 adds "1" parity to the end of the new capability information according to the format of the capability information (Phy Capabilities) in FIG. 14 (step S106). Then, the controller 4 sets the new capability information on the work area as the capability information (Phy Capabilities) of the storage device 3 in the register 25 of FIG. 1 (step S107). The capability information (Phy Capabilities) set in the register 25 is transmitted to the host system 1 in speed negotiation.

Figure 15:
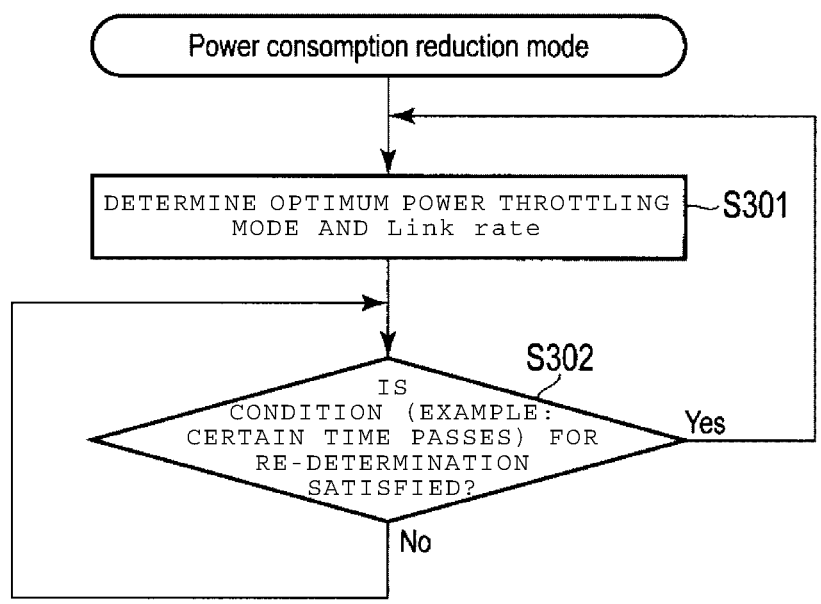
FIG. 15 is a flowchart showing a procedure of processing of periodically re-determining the power throttling mode and the link rate suitable for the second mode that gives priority to power saving.

The flowchart of FIG. 15 shows a procedure of processing of periodically re-determining the power throttling mode and the link rate suitable for the power consumption reduction mode (Power Consumption Reduction Mode) that gives priority to the reduction of power consumption.

In a case where Power Consumption Reduction Mode is specified by the user, as described in the flowchart of FIG. 6, the CPU 11 of the host system 1 determines the link rate and the power throttling mode suitable for the Power Consumption Reduction Mode in consideration of both the power consumption efficiency and the number of I/Os to be processed. Then, the CPU 11 sends link rate specification information specifying the determined link rate and mode specification information specifying the determined power throttling mode to the storage device 3 and instructs the storage device 3 to execute the power throttling operation for limiting the maximum power consumption of the storage device 3 in the determined power throttling mode.

The controller 4 of the storage device 3 executes a power throttling operation for limiting the maximum power consumption of the storage device 3 to the maximum power consumption corresponding to a combination of the link rate specified by the received link rate specification information and the power throttling mode specified by the received mode specification information. Further, in order to establish a link between the host system 1 and the storage device 3 at the link rate specified by the link rate specification information, the controller 4 generates new capability information (Phy Capabilities) including the link rate specified by the link rate specification information as a maximum link rate and transmits the generated new capability information (Phy Capabilities) to the host system 1 when establishing a link between the host system 1 and the storage device 3.

As described above, by considering the number of I/Os to be processed, it is possible to select a power throttling mode suitable for Power Consumption Reduction Mode more accurately.

However, the number of I/Os to be processed may fluctuate over time. Therefore, in a case where Power Consumption Reduction Mode is specified by the user, the CPU 11 may periodically re-determine the power throttling mode and the link rate suitable for the Power Consumption Reduction Mode. In this way, it is possible to dynamically change the power throttling to be used and the link rate to be used according to the fluctuation of the number of I/Os to be processed.

First, the CPU 11 determines the power throttling mode and the link rate suitable for Power Consumption Reduction Mode by the same procedure as described in the flowchart of FIG. 6 (step S301). In step S301, the CPU 11 sends link rate specification information specifying the determined link rate and mode specification information specifying the determined power throttling mode to the storage device 3.

In a case where the condition for re-determination is satisfied (for example, in a case where a fixed time has passed since the previous decision) (Yes in step S302), the CPU 11 proceeds to the process of step S301 and re-determines a link rate and a power throttling mode suitable for the Power Consumption Reduction Mode in consideration of both the power consumption efficiency and the number of I/Os to be processed at present (step S301). If the link rate and the power throttling mode previously determined, and the link rate and the power throttling mode determined this time are different, the CPU 11 sends the link rate specification information specifying the re-determined link rate and the mode specification information specifying the re-determined power throttling mode to the storage device 3. Regardless of whether or not the link rate and the power throttling mode previously determined, and the link rate and the power throttling mode determined this time are different, the CPU 11 may send the link rate specification information specifying the re-determined link rate and the mode specification information specifying the re-determined power throttling mode to the storage device 3.

As described above, according to the present embodiment, the host system 1 determines a power throttling mode suitable for a mode specified by the user in the first power throttling mode and the second power throttling mode based on information indicating a correspondence relationship between maximum power consumption and power consumption efficiency for each link rate of the storage device 3 in a case where the storage device 3 is set to the first power throttling mode that gives priority to performance and a correspondence relationship between the maximum power consumption and the power consumption efficiency for each link rate of the storage device 3 in a case where the storage device 3 is set to the second power throttling mode that gives priority to reduction of peak power, and a mode specified by the user from among the first mode that gives priority to performance, the second mode that gives priority to reduction of power consumption, and the third mode that gives priority to reduction of peak power. Then, the host system 1 instructs the storage device 3 to execute the power throttling operation for limiting the maximum power consumption of the storage device 3 in the determined power throttling mode. In this case, by sending mode specification information specifying the determined power throttling mode to the storage device 3, the host system 1 instructs the storage device 3 to execute in the determined power throttling mode.

Therefore, depending on which mode is specified by the user, it is possible to cause the storage device 3 to execute the power throttling operation in the first power throttling mode that gives priority to performance or the second power throttling mode that gives priority to reduction of peak power, thereby flexibly controlling the power consumption of the storage device 3.

In addition, in the present embodiment, in the host system 1, the link rate suitable for the mode specified by the user is further determined, and both the determined link rate and the determined power throttling mode are instructed to the storage device 3. Therefore, it is possible to flexibly control both the link rate and the maximum power consumption according to which mode is specified by the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device configured to communicate with a host system, the device comprising:
   a serial interface configured to support a plurality of link rates;
   a memory that stores information indicating a relationship between a maximum power consumption and a power consumption efficiency value for each link rate in first and second power throttling modes supported by the storage device, the first power throttling mode giving priority to performance of the storage device, the second power throttling mode giving priority to reduction of peak power of the storage device, the power consumption efficiency value being a value that corresponds to the number of I/Os per watt; and
   a controller configured to:
      receive from the host system via the serial interface an instruction to change a power throttling mode to one of the first and second throttling modes, which is selected by the host system based on the information and a user preference for performance of the host system, the user preference being one of:
         a first mode that gives priority to performance of the host system,
         a second mode that gives priority to reduction of power consumption of the host system, and
         a third mode that gives priority to reduction of peak power of the host system; and
      limit the maximum power consumption of the storage device based on the instruction received from the host system,
   wherein the controller is further configured to:
      store default capability information indicating the link rates supported by the storage device in a plurality of bits,
      mask bits in the plurality of bits that do not correspond to a range of link rates that starts at a minimum link rate of the storage device and ends at a maximum link rate specified by the host system, and
      transmit to the host system the masked plurality of bits.

2. The storage device according to claim 1,
   wherein the user preference is specified by a user of the host system.

3. The storage device according to claim 2,
   wherein the controller is configured to:
      receive link rate specification information specifying a link rate suitable for the selected power throttling mode and determined by the host system based on the user preference specified by the user and the information; and
      limit the maximum power consumption of the storage device based on the specified link rate and the selected power throttling mode.

4. The storage device according to claim 1,
   wherein the controller is configured to transmit the masked plurality of bits when establishing a link with the host system.

5. The storage device according to claim 1,
   wherein the controller is configured to:
      insert a start bit of "1" to the masked plurality of bits;
      determine whether a total number of bits of "1" included in the masked plurality of bits is even or odd; and
      when the total number of bits is odd, add a parity bit of "1" to the masked plurality of bits.

6. The storage device according to claim 5,
   wherein the controller is configured to:
      determine whether or not frequency spreading of a signal is performed before determining whether the total number of bits set to "1" is even or odd; and
      when the frequency spreading is not performed, update the first bit group by masking a bit indicating that the frequency spreading is performed.

* * * * *